UNITED STATES PATENT OFFICE.

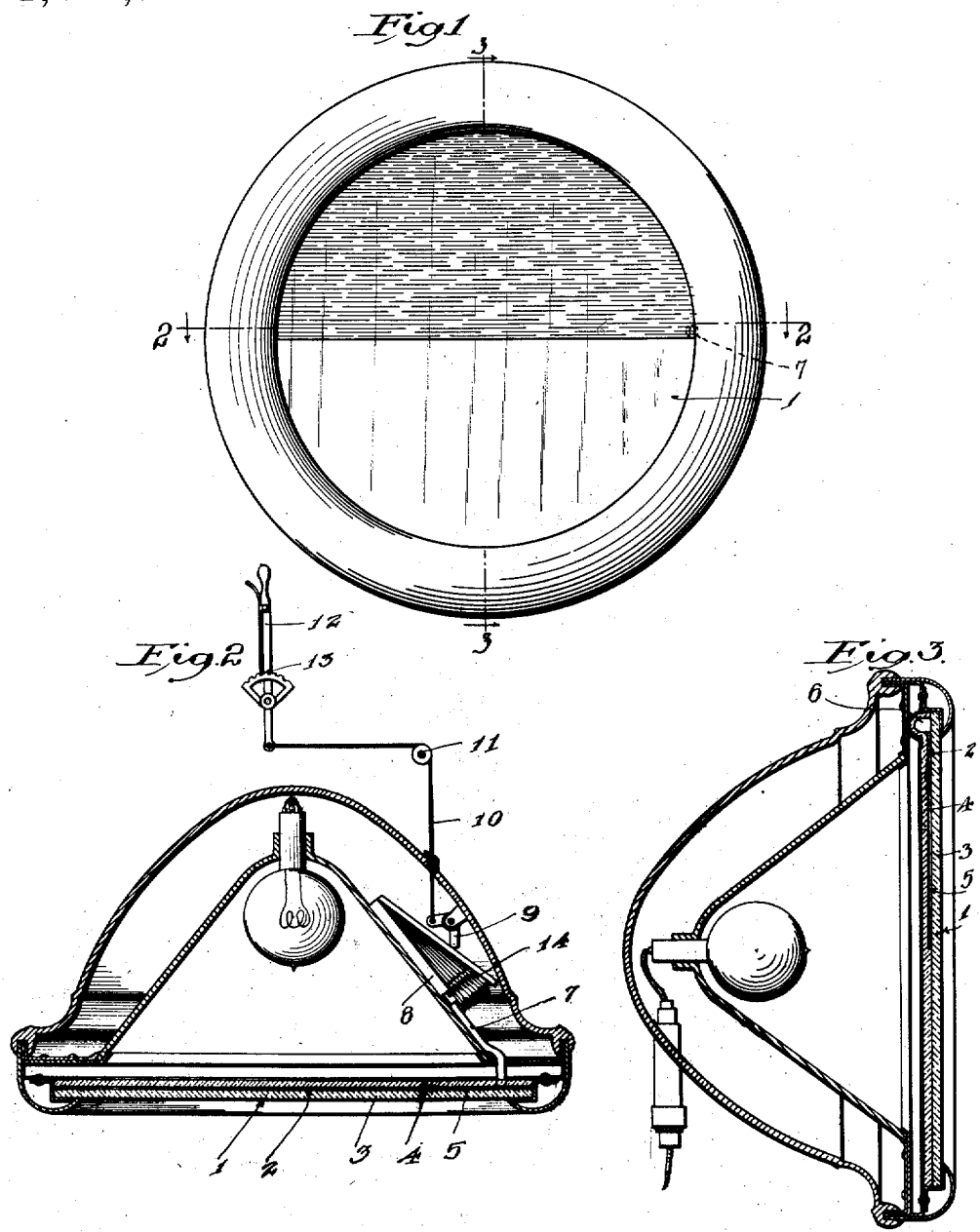

WILLIAM J. STARKWEATHER AND FLOYD C. MILLER, OF LOS ANGELES, CALIFORNIA.

LAMP-DIMMER.

1,193,942.   Specification of Letters Patent.   Patented Aug. 8, 1916.

Application filed May 19, 1915. Serial No. 29,069.

*To all whom it may concern:*

Be it known that we, WILLIAM J. STARKWEATHER and FLOYD C. MILLER, both citizens of the United States, residing at Los Angeles, in the county of Los Angeles and State of California, have invented a new and useful Lamp-Dimmer, of which the following is a specification.

This invention relates to improvements in lamp dimming devices for automobile and other lamps and resides in the provision of simply constructed and effective means which may be operated to eliminate the blinding glare usually prohibited by law in city streets and to cause a bright non-glaring light to be given.

Another object of importance is to provide a dimming device of the character described which may be quickly and easily installed and operated at will from the driver's seat of a vehicle.

The invention consists in certain novel features of construction and combinations, and arrangement of parts as will be more fully hereinafter described and pointed out in the claims.

The accompanying drawings illustrate the invention.

Figure 1 is a front elevation of a lamp provided with our improved dimmer; Fig. 2 is a horizontal sectional view taken on line 2—2 of Fig. 1 showing the operating means; and Fig. 3 is a vertical sectional view taken on line 3—3 of Fig. 1.

Referring to the drawings, a lamp lens 1 which in this instance is circular, is formed with a compartment or fluid-receiving space 2 which preferably takes up the entire upper half of the lens but may cover more or less of the lens area, as desired.

The lens 1 is preferably formed of two circular glass plates 3 and 4 and one of the plates is recessed as at 5 upon one inner face on the upper half thereof so as to provide the space or compartment 2 when the plates are secured together. The plates are secured together in any suitable manner but necessarily so as to seal or close the space or compartment and make it comparatively air tight. The space or compartment may be formed in the lens in any other suitable manner, however.

The lens is constructed to allow air in the space 2 to escape therefrom so as to provide for an effective operation of the device as will be later more fully described. A hollow bulb-like member 6 is formed on the upper edge of one of the plates, preferably the inner one. This bulb is preferably formed integral with the plate and communicates with the space 2.

A short tube 7 adapted to contain sufficient fluid to fill the space 2 is connected with the lens and communicates with the space 2 preferably at a point near one side and at the lower end of said space. The other end of this tube is connected with a bellows member 8 which is carried in or upon the lamp in any suitable manner. The bellows member 8 is adapted to be compressed by a lever 9 which is pivoted on the lamp intermediate its ends and is operated by a flexible element 10 connected thereto at one end thereof. The flexible element 10 may be passed around a pulley 11 which is adapted to be secured in any suitable manner upon the vehicle, not shown, and is connected with an operating lever 12. The lever 12 is provided with locking means 13 of the ordinary character and is adapted to be secured upon the vehicle, not shown, at a point near the driver's seat. The bellows 8 is forced into open position by an expansive spring 14 mounted therein.

The fluid may be opaque or translucent, for example mercury, or its equivalent or any colored or clouded fluid such as red, blue, etc., may be used and shall be hereinafter termed, dimming fluid. When mercury is used it may be arranged so that part of the inner face of the lens when the mercury is forced into the space 2 will act as a mirror and reflect the light rays back upon the main reflector of the lamp.

In operation when it is desired to dim the lamp, the lever 12 is pulled in the proper direction and the lever 9 is caused to compress the bellows 8, thus forcing the dimming fluid in the tube 7, into the space 2. The air in the space is allowed to escape into the bulb member 6 and is therefore not compressed to such an extent that any appreciable resistance is offered the fluid. After the operating lever 12 has been moved into operating position it is locked by the locking means 13. When the fluid is in the space 2 the bright light rays emanating from the lamp are directed out and down instead of out and up, thus eliminating the "glare". To clear the lens the lever is pulled back into normal position and the bellows is permitted to expand thus creating a suction in the tube 7 and causing the fluid to be drawn aided by force of gravity from the space 2 into the tube.

With reference to the foregoing description and accompanying drawings it will be observed that we have provided dimming means which will not only operate successfully and effectively with automobile and other vehicle lamps but may be applied to various kinds of lamps and lights and if desired constructed so that the entire light given from a lamp may be shut off from view. Our dimming means may be quickly and easily attached to lamps and upon vehicles of different character without necessitating any change in the construction thereof.

In practice we have found that the form of our invention illustrated in the drawings and referred to in the above description as the preferred embodiment is the most efficient and practical, yet realizing that the conditions concurrent with the adoption of our device will necessarily vary, we desire to emphasize the fact that various minor changes in construction, proportion and arrangement of parts may be resorted to when required without sacrificing any of the advantages of our invention as set forth in the appended claims.

We claim:

1. In a lamp dimmer the combination with a lamp including a lens formed of two glass plates held one upon the other, one of the plates being recessed upon the upper half of its inner face to form a dimming fluid receiving space between the plates, of a dimming fluid supply carried by the lamp and communicating with the space in the lens, and means to force the fluid into and draw it out of the space, said space being enlarged at one edge thereof, the enlargement adapted to receive air disposed by the dimming fluid when the latter is forced into the space.

2. In a lamp dimmer the combination with a lamp including a casing, a source of light and a lens having a dimming fluid receiving space therein covering only a portion of its area, a pump carried by the lamp, a tube communicating with the pump and fluid receiving space, a dimming fluid mounted in said tube and being normally held by force of gravity out of the space therefor, and means to operate the pump whereby fluid will be forced into the space therefor and bright light will be prevented issuing through the portion of the lens covered by the dimming fluid receiving space.

3. In a lamp dimmer the combination with a lamp, including a casing and a lens mounted in and closing the casing, of a bellows mounted in the casing, said lens having a fluid receiving space therein covering the upper half of its area, a tube connected with the bellows and space, a dimming fluid mounted in the tube adapted to be forced into the space in the lens, means to compress the bellows to force the fluid into the space and means to open the bellows to cause the fluid to be drawn from the space into the tube.

4. In a lamp dimmer in combination with a casing including a lens having a dimming fluid receiving space covering the upper half only thereof, a bellows mounted in said casing and a spring in said bellows to normally hold it open, a tube connected with the space and bellows, a dimming fluid mounted in the tube, a bell crank pivoted in said casing having one end resting upon one side of the bellows, a flexible element connected with said bell crank, and a lever connected with said flexible element.

In testimony whereof, we have hereunto set our hands at Los Angeles, California, this 13th day of May, 1915.

WILLIAM J. STARKWEATHER.
FLOYD C. MILLER.

In presence of—
CHAS. J. CHUNN,
L. BELLE WEAVER.